Figure 1:
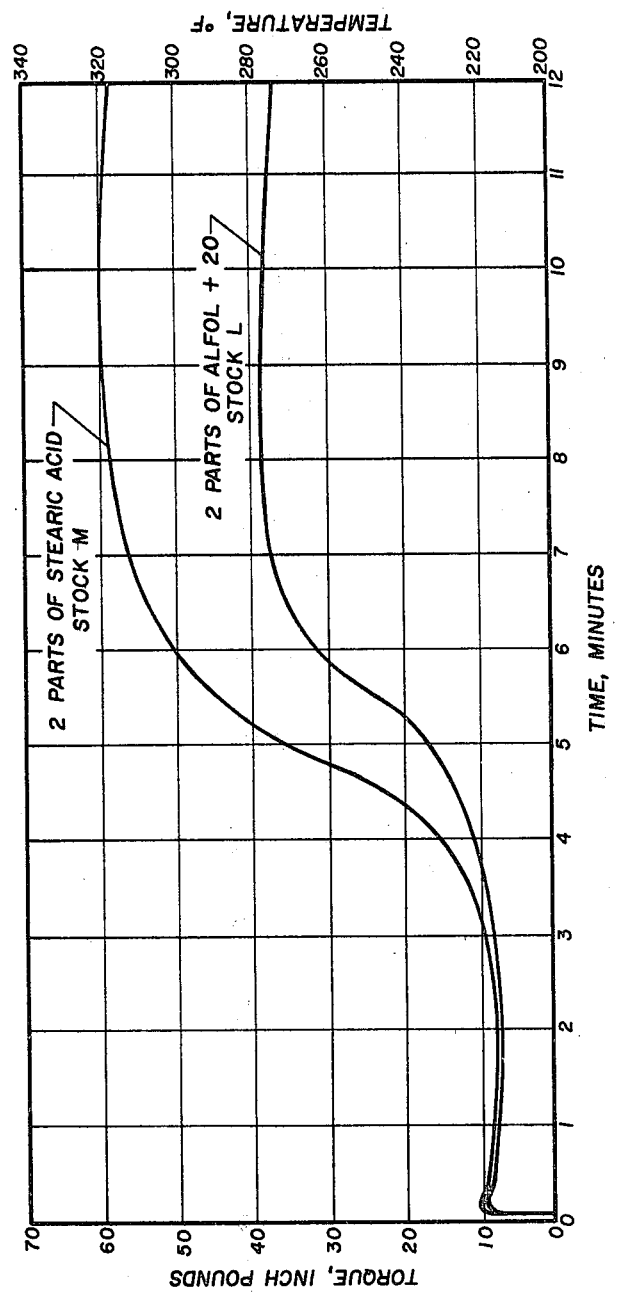
Figure 2:
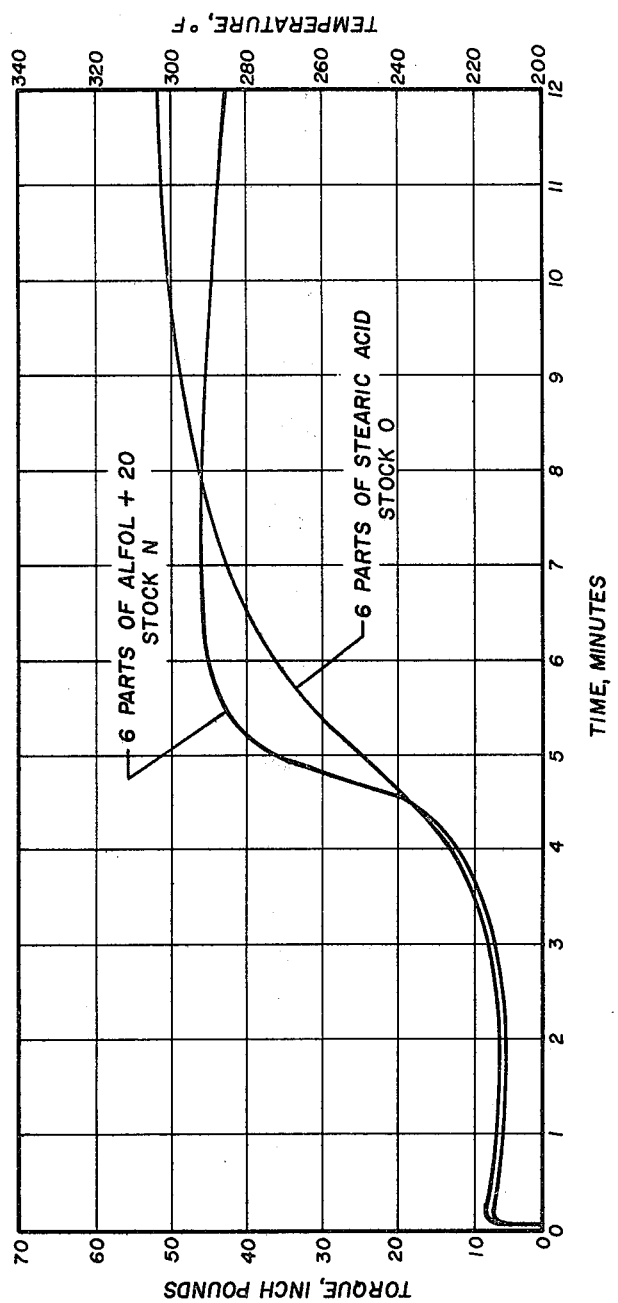

United States Patent [19]

Kuceski et al.

[11] 4,309,302

[45] Jan. 5, 1982

[54] RUBBER ADDITIVES

[75] Inventors: Vincent P. Kuceski, Chicago Heights, Ill.; Lenoir Black, Memphis, Tenn.

[73] Assignee: The C. P. Hall Company, Chicago, Ill.

[21] Appl. No.: 91,852

[22] Filed: Nov. 6, 1979

Related U.S. Application Data

[63] Continuation of Ser. No. 658,424, Feb. 17, 1976, Pat. No. 4,173,552, which is a continuation of Ser. No. 496,611, Aug. 12, 1974, abandoned.

[51] Int. Cl.$^3$ ............................................. C09K 3/00
[52] U.S. Cl. .................................................. 252/182

[58] Field of Search ............................... 252/189, 182; 260/23.7 M, 97.5, 33.6 UA, 31.2 MR, 31.8 DR, 33.4 PQ, 752, 761

[56] References Cited

U.S. PATENT DOCUMENTS 2,713,572  7/1955  Hall ............................. 260/23.7 M
3,882,062  9/1975  Aron ............................ 260/23.7 M

*Primary Examiner*—John F. Niebling
*Attorney, Agent, or Firm*—Mason, Kolehmainen, Rathburn & Wyss

[57] ABSTRACT

Aliphatic alcohols, esters of such alcohols and aliphatic dicarboxylic acids, mixtures of such alcohols and esters and mixtures of such alcohols and esters with aliphatic carboxylic acids are used as additives in the vulcanization of rubbers.

3 Claims, 2 Drawing Figures

RUBBER ADDITIVES

CROSS REFERENCE TO RELATED APPLICATION

This application is a continuation of Ser. No. 658,424 filed Feb. 17, 1976 now U.S. Pat. No. 4,173,552 which is a continuation of Ser. No. 496,611 filed Aug. 12, 1974, now abandoned.

FIELD OF THE INVENTION

Stearic acid and other aliphatic long-chain monocarboxylic acids containing substantially 12 to 18 carbon atoms such as lauric acid, oleic acid and palmitic acid, etc. have been widely used as activators of the acceleration of the vulcanization of olefinic rubber. This invention relates to the vulcanization of such rubber with sulphur and an accelerator and an additive which may replace at least a part of the stearic or other such acid used in rubber mixes.

PRIOR ART

Although stearic acid is the principle vulcanization activator, other long chain monocarboxylic acids including oleic acid and lauric acid, and mixtures of acids from cottonseed, linseed, cocoanut, soybean, treated tallow and fishoils, etc. have been marketed for use as activators.

SUMMARY OF THE INVENTION

According to this invention, at least a part of the stearic or other long-chain monocarboxylic acid used as an activator in the vulcanization of olefinic rubbers is replaced by a substantial amount of (a) an aliphatic alcohol containing 12 to 28 carbon atoms; (b) an ester of such an alcohol and a carboxylic acid containing 4 to 22 or as many as 54 carbon atoms; (c) a mixture of a substantial amount of such an alcohol and a substantial amount of such a carboxylic acid; (d) a mixture of a substantial amount of such an ester with a substantial amount of such a carboxylic acid and (e) a mixture of a substantial amount of such an alcohol, a substantial amount of such a carboxylic acid and a substantial amount of such an ester. The compounds or mixtures are non-volatile at 150° to 200° F. or at whatever the temperature to which the rubber mix is heated.

As with stearic acid, the replacement additives bring about improved functioning of the sulfur, zinc oxide and other compounding ingredients in the rubber mix. The exact mechanism is not understood.

The term "olefinic rubber" is used herein to include natural rubber and the synthetic rubbers derived at least in part from a conjugated diene or other olefin.

The carboxylic acids may be used (1) to mix with, and/or to react with, the long-chain alcohols to form esters containing one to three or more carboxylic acid groups, and (2) to mix with such esters with or without such an alcohol, are aliphatic hydrocarbon (either branched or straight chain, saturated or unsaturated, cyclic or acylic) or aromatic in character, and may contain aromatic or aliphatic hydrocarbon residues. They must contain at least four carbon atoms including the carboxylic acid groups, and may contain as many as 22 carbon atoms. Examples of the carboxylic acids are given below:

| Monocarboxylic | Dicarboxylic | Tricarboxylic |
| --- | --- | --- |
| Butyric | Succinic | Aconitic |
| Valeric | Glutaric | Citric |
| Hexanoic (caproic) | Adipic | Tricarballylic |
| Hepanoic | Pimelic | Trimer oleic acid |
| Octanoic (caprylic) | Suberic | Trimellitic |
| Pelargonic | Azelaic | |
| Capric | Sebacic | |
| Undeconoic | Dodecanedioic | |
| Lauric | Brassylic | |
| Myristic | Thapsic | |
| Palmitic | Phthalic | |
| Stearic | Isophthalic | |
| Behenic | Terephthalic | |
| Napthenic | Maleic | |
| | 21-Acid* | |
| | Dimer oleic | |

*21-Acid is the mixture of acid produced according to U.S. Pat. No. 3,753,968.

and dimers thereof and C-12 dibasic acids which result from the polymerization of unsaturated fatty acids and the like.

The long chain alcohols which may be used (1) alone or (2) in esterifying the acids or (3) in admixture such an acid and/or ester, are saturated or unsaturated, straight-chain or branched-chain aliphatics and include at least 12 carbon atoms, and may contain up to 28 or more carbon atoms. The shorter chain alcohols are too volatile and may emit disagreeable odors. These long chain alcohols include lauryl, alcohol, myristyl, stearyl, eicosyl, cetyl alcohol, behenyl alcohol, and also the odd-chain tridecyl, pentodecanyl, heptodecyl and monodecyl alcohols. The reference to the long-chain alcohols herein includes alcoholic bottoms such as, for example, those resulting from the oxo processes and processes in which alcohols are manufactured from alpha-olefins and from the hydrogenation of fats and oils. They include the branched chain and iso-alcohols, and may be secondary alcohols, but not tertiary alcohols, if used for esterification with a carboxylic such as just described.

By-product alcohols are included, such as Alfol® 20+ and Alfol® 22+ obtainable from Petrochemical Department of Continentoal Oil Co. and Epal® C-20+ alcohols from the Ethyl Corporation. Their homolog distribution, on 100% alcohol basis as determined by gas-liquid chromatography is, approximately:

| Alcohol | Alfol 20+ | Epal C-20+ | Alfol 22+ |
| --- | --- | --- | --- |
| $C_{18}$ and lower | 2 % | 0–2 | 1 % |
| $C_{20}$ | 60 | 10–20 | 5 |
| $C_{22}$ | 20 | 10–15 | 60 |
| $C_{24}$ | 10 | 5–15 | 21 |
| $C_{26}$ | 5 | 8–12 | 9 |
| $C_{28}$ and higher | 3 | 11–30 | 4 |
| | 100 % | — | 100 % |
| Normal alcohols | 71 | 33 | 60 |
| Branched alcohols | 18 | 34 | 10 |
| Hydrocarbons | 9 | 30 | 30 |
| Esters | 2 | 3 | 3 |

Typical properties are given as:

| | Alfol 20+ | Epal C-20+ | Alfol 22+ |
| --- | --- | --- | --- |
| Alcohol content, approximate | 70 | 67 | 60 |
| Hydroxyl number | 123 | 100 | 90 |
| Saponification number | 3 | 1.6 | 6 |
| Iodine number | 12 | 9 | 13 |

-continued

|  | Alfol 20+ | Epal C-20+ | Alfol 22+ |
|---|---|---|---|
| Carboxy, % (As C=O) | 0.2 | .16 | 0.3 |
| Water, % | 0.05 | — | 0.03 |
| Melting range, °C. | 45–57 | 45 (min) | 45–65 |
| Color, Gardner, Molten | 12 | 4 | 18 |

Such materials classify as long-chain alcohols as herein contemplated. They include at least substantially 50% of alcohols which contain at least 12 carbon atoms.

Heavy oxo-ends are also included as alcohols herein. The properties and analysis of such heavy oxo-ends follow:

| Boiling range at 20 mm. Hg. pressure | 143–316° C. |
|---|---|
| Specific Gravity | 0.840–0.880 |
| GC analysis: | |
| $C_{11}$ alcohol | 14.4% |
| $C_{13}$ alcohol | 8.3% |
| Longer chain alcohols, ethers, glycols | 76.3% |
| Hydroxyl No. | 226 ± 10 |

Only those oxo-ends which are substantially non-volatile at 200° F. are usable alone, and for admixture with the other additives referred to herein, the boiling range of the oxo-end should be such that the total additive is non-volatile at substantially 200° F.

The acid number of an acid and the saponification number of an ester, to which this invention relates, is at least 50.

The acid number or saponification number is defined as the number of milligrams of potassium hydroxide which will react with 1 gram of the substance. Acid value refers to free acidity of carboxylic groups, while saponification value refers to the carboxylic groups tied up as esters.

The results of the examples which follow show that the addition of acid may retard the rate of the cure of a rubber mix. The addition of alcohol may not retard the cure of a rubber mix. The addition of alcohol may not retard the cure as much as stearic acid; it improves the physical properties of the mix and/or vulcanizate. The addition of ester such as that to which the invention relates improves processing and absorption of pigment.

The additive is used in mixes of natural rubber and synthetic olefinic rubbers which contain sulfur and zinc oxide in substantially the proportion which is usual for stearic acid. Some stearic acid may be used in the rubber mix, and then less additive is required.

The invention is illustrated in the following examples:

EXAMPLE I

| Functional Groups | —COOH | | | | —OH, —COOH | | | | —OH—COOH | | | |
|---|---|---|---|---|---|---|---|---|---|---|---|---|
| Source | Stearic Acid | | | | Alfol 20+, Azelaic acid | | | | Alfol 20+, Stearic acid | | | |
| Stock | A(Control) | | | | B | | | | C | | | |
| SBR | 490 | | | | 490 | | | | 490 | | | |
| Zinc Oxide | 6 | | | | 6 | | | | 6 | | | |
| Flexamine G | 2 | | | | 2 | | | | 2 | | | |
| Witco 127 | 0.80 | | | | 0.80 | | | | 0.80 | | | |
| Stearic Acid | 2 | | | | | | | | | | | |
| RX 10920 | | | | | 2 | | | | | | | |
| RX 10921 | | | | | | | | | 2 | | | |
| Santocure | 2.40 | | | | 2.40 | | | | 2.40 | | | |
| Thionex | .40 | | | | .40 | | | | .40 | | | |
| Sulfur | 5 | | | | 5 | | | | 5 | | | |
| Cured at 292° F. | M300 | TB | EB | DURO | M300 | TB | EB | DURO | M300 | TB | EB | DURO |
| 10 min. | 650 | 2300 | 760 | 55 | 200 | 1100 | 820 | 48 | 600 | 2100 | 760 | 55 |
| 20 min. | 1575 | 2950 | 510 | 61 | 1525 | 2900 | 500 | 59 | 1600 | 2975 | 510 | 62 |
| 30 min. | 1700 | 2950 | 480 | 62 | 1775 | 2900 | 460 | 60 | 1700 | 2875 | 460 | 63 |
| 40 min. | 1800 | 2950 | 480 | 63 | 1775 | 2900 | 460 | 60 | 1800 | 2975 | 460 | 63 |
| 60 min. | 1800 | 2975 | 480 | 62 | 1825 | 3000 | 470 | 61 | 1750 | 2900 | 460 | 63 |

M300 = modulus at 300%.
TB = tensile at break.
EB = elongation at break.
DURO = Durometer reading.
Flexamine G is a diarylamine-ketone reaction product.
Thionex is tetramethylthiuram monosulfide.
RX 10920 - Azelaic acid, 20%; long-chain alcohol mixture (Alfol 20+), 80%.
RX 10921 - Alfol 20+ 50% plus Stearic acid 50%
Santocure = N-cyclohexyl-2-benzothiazole sulfenamide
Witco 127 = Blend of waxy hydrocarbon

EXAMPLE II

| | HOT PATCH | | |
|---|---|---|---|
| Functional Groups | —COOH | —OH, —COOH | —OH—COOH |
| Source | Stearic acid | Alfol 20+, Azelaic acid | Alfol 20+, Stearic acid |
| Stock | D(Control) | E | F |
| Natural rubber | 200 | 200 | 200 |
| Stearic acid | 4 | | |
| RX 10920 | | 4 | |
| RX 10921 | | | 4 |
| Zinc oxide | 24 | 24 | 24 |
| Microwhite No. 50 | 120 | 120 | 120 |
| Naugawhite | 2 | 2 | 2 |
| C-566 | 2 | 2 | 2 |
| Rosin Oil No. 48 | 5 | 5 | 5 |

-continued

| | HOT PATCH | | | | | | | | | | | |
|---|---|---|---|---|---|---|---|---|---|---|---|---|
| Functional Groups | —COOH | | | | —OH, —COOH | | | | —OH—COOH | | | |
| Source | Stearic acid | | | | Alfol 20+, Azelaic acid | | | | Alfol 20+, Stearic acid | | | |
| Stock | D(Control) | | | | E | | | | F | | | |
| 0150 Cushion | 2.28 | | | | 2.28 | | | | 2.28 | | | |
| Pepton 65 | 0.30 | | | | 0.30 | | | | 0.30 | | | |
| A-1 | 9.50 | | | | 9.50 | | | | 9.50 | | | |
| Sulfur | 9 | | | | 9 | | | | 9 | | | |
| Cured at 260° F. | M300 | TB | EB | DURO | M300 | TB | EB | DURO | M300 | TB | EB | DURO |
| 5 min. | 225 | 1900 | 700 | 36 | 200 | 1350 | 640 | 34 | 200 | 1600 | 700 | 34 |
| 7 min. | 225 | 2050 | 720 | 37 | 225 | 1900 | 700 | 34 | 225 | 1825 | 700 | 35 |
| 9 min. | 250 | 2275 | 700 | 40 | 250 | 2100 | 680 | 36 | 250 | 2075 | 680 | 37 |
| 12 min. | 275 | 2050 | 650 | 41 | 275 | 2125 | 680 | 38 | 250 | 2150 | 680 | 39 |

Naugawhite is alkylated bisphenol.
A-1 is thiocarbanilide.
Microwhite No. 50 is natural ground calcium carbonate
Pepton 65 is zinc 2-benzamidothiophenate

EXAMPLE III

| | RUBBER MAT | | | | | | | | | | | |
|---|---|---|---|---|---|---|---|---|---|---|---|---|
| Functional Groups | —COOH | | | | —OH$^{DI}$,—COOH | | | | —OH—COOH | | | |
| Stock | G(Control) | | | | Alfol 20+, Azelaic acid H | | | | Alfol 20+, Stearic acid I | | | |
| Butadiene-styrene rubber 173 | 150 | | | | 150 | | | | 150 | | | |
| AC Poly | 2 | | | | 2 | | | | 2 | | | |
| Picco 6100 | 5 | | | | 5 | | | | 5 | | | |
| Witco 127 | 3 | | | | 3 | | | | 3 | | | |
| Stearic acid | 1.50 | | | | | | | | | | | |
| RX 10920 | | | | | 1.50 | | | | | | | |
| RX 10921 | | | | | | | | | 1.50 | | | |
| Zinc oxide | 3 | | | | 3 | | | | 3 | | | |
| Micro-Fil No. 1 | 50 | | | | 50 | | | | 50 | | | |
| McNamee Clay | 150 | | | | 150 | | | | 150 | | | |
| Amax | 3 | | | | 3 | | | | 3 | | | |
| E. Tuads | 0.80 | | | | 0.80 | | | | 0.80 | | | |
| Sulfur | 3 | | | | 3 | | | | 3 | | | |
| Yellow MB | 1 | | | | 1 | | | | 1 | | | |
| Blue 60 | 0.60 | | | | 0.60 | | | | 0.60 | | | |
| Cured at 320° F. | G | | | | H | | | | I | | | |
| | M300 | TB | EB | DURO | M300 | TB | EB | DURO | M300 | TB | EB | DURO |
| 5 min. | 325 | 900 | 570 | 51 | 325 | 1000 | 670 | 50 | 400 | 900 | 550 | 51 |
| 7 min. | 350 | 750 | 520 | 51 | 350 | 875 | 580 | 51 | 400 | 850 | 530 | 51 |
| 9 min. | 350 | 725 | 510 | 51 | 350 | 750 | 540 | 51 | 400 | 825 | 500 | 51 |
| 12 min. | 325 | 700 | 510 | 51 | 350 | 800 | 530 | 51 | 400 | 800 | 500 | 51 |

Picco 6100 is a petroleum - hydrocarbon resin plasticizer.
McNamee Clay is a soft kaolin clay.
E. Tuads is tetraethylthiuram sulfide.
Micro-Fil No. 1 - solid mineral filler.
Amax is N-oxydiethylene benzothiazole-2-sulfenamide.
AC Poly is a low molecular weight polyethylene manufactured by Allied Chemical Company

DISCUSSION OF EXAMPLES I, II and III

EXAMPLE I

This example shows how an alcohol of this invention with added carboxylic groups from dibasic acid (Stock B) and a mixture of such an alcohol and stearic acid (Stock C) perform in an SBR recapping Tread Stock using stearic acid as a control (Stock A).

The stress strain data of the three stocks which were mixed and heated the same way show no differences which exceed experimental error. These three stocks were made in order to show up any differences which might appear due to the different functional groups present in the additives, e.g. stearic acid with the carboxyl group (—COOH), the hydroxyl group (—OH) with carboxylic group from a dicarboxylic acid, and the mixture of hydroxyl and carboxyl groups (—COOH, —OH) from long-chain alcohols and stearic acid.

In particular, attention is drawn to the 300% moduli data since this date is considered by some to be an accurate representation of the state of cure of a rubber compound. Since the data given are all within experimental error at 2950 psi±25 psi, it seems that all three compounds behave equivalently. Thus, long-chain alcohol seems equivalent to the stearic acid, and when carboxyl groups are added in the form of a dibasic acid, the effect is picked up by the 300% modulus reading.

A further study was made of these stocks by means of a Monsanto Rheometer, which can be used to measure the cure rate of rubber over a period of time. In these tests, which bring out the polymer curing characteristics in terms of twist or torque at a definite temperature (350° F. in all of these cases), the Rheometer shows that Stock C. containing the Alfol 20+ with added stearic acid behaves very much like the stearic acid Control A, whereas Stock B shows slightly less acceleration of cure by a few seconds. Stock B contains carboxyl group from azelaic acid. In fact, it is often desirable to have slightly less acceleration of cure for plant processing.

EXAMPLE II

Example II shows a series of three stocks, D, E and F, made with a ribbed smoked sheet natural rubber. Again, results at 300% modulus at the optimum cure times are within experimental error, except possibly the durometer hardness, which shows lower hardness values. These lower durometer values coupled with the excellent 300% modulus, tensile at break and elongation at break are often very desirable qualities.

The Rheometer tests reflect the same qualities obtained when the tread stock was tested. That is, (1) the alcohol-containing stocks E and F showed some influence on acceleration of cure rate, (2) the presence of some dicarboxyl group in Example E, showed somewhat more acceleration, and (3) the Stock F using alcohol and stearic acid showed the least acceleration of cure. The characteristic of this cure using the long-chain alcohol indicates a large safety factor in plant production. This longer processing produces elastomers with a superior combination of properties.

EXAMPLE III

This example shows the tests on a stock which is a high mineral-loaded rubber. This series shows up more differences, even though less stearic acid and alcohols are used in the formula or recipe.

Superior modulus at 300%, tensile at break and elongation at break properties are obtained in the examples using Alfol 20+.

The Rheometer curves obtained are the most marked by differences. As before, the acceleration was less, but the acceleration differed by 20–25 seconds where before the difference was only 4–8 seconds. Stock G, containing stearic acid, cured rapidly in 3 minutes. Stock H, containing dicarboxyl groups, took longest to cure, while Stock I, containing carboxyl and Alfol 20+, cured at a rate between the other two. The Stock I gave the best physicals of the three.

EXAMPLE IV

In another example using a natural rubber recipe, we test stearic acid against Epal 20+, a long chain alcohol mixture containing branch chains.

| Recipe | | | | | |
|---|---|---|---|---|---|
| | Parts | | | | |
| #1 Ribbed Smoke Sheet | 100.0 | | | | |
| HAF Black | 55.0 | | | | |
| Sun Par | 20.0 | | | | |
| Ble 25 | 1.0 | | | | |
| Santocure NS* | 0.7 | | | | |
| Sulfur | 3.0 | | | | |
| ZnO | 5.0 | | | | |
| Fatty Acid or Epal C-20+ | 2.0 | | | | |
| Cure Temperature - 285° F. | | | | | |
| Stock | J | | | K | |
| Additive | Stearic Acid | | | Epal C-20+ | |
| Cure Time, min. | 20 | 30 | 45 | 20 | 30 | 45 |
| 300% Modulus | 1750 | 2220 | 2400 | 1950 | 2090 | 2100 |
| Tensile | 3470 | 3740 | 3640 | 3650 | 3740 | 3610 |
| Elongation | 560 | 520 | 480 | 560 | 510 | 520 |
| Shore Hardness | 60 | 64 | 64 | 60 | 63 | 63 |
| Monsanto Rheometer 3° arc, 3 cycles/min MPC dies: 30 sec. preheat, 60' motor ASTM D2084 | Torque min. max. scorch time | | | 8.9 86.4 | 10.7 73.8 |

| Recipe | | |
|---|---|---|
| | Parts | |
| 2 pt. TS2 | 8.8 | 9.1 |

Santocure NS = n-tert-butyl-2-benzothiazole sulfenamide

Example IV shows that, by the use of a long chain alcohol only vs. a stearic acid, a natural rubber compound could be made having the same properties, but perhaps more importantly, the rheometer shows that the power requirements are much less. This benefit alone in this time of higher energy costs and lower energy availability makes the use of these long chain alcohols of major importance to industry and the country.

EXAMPLE V

Diester of Long Chain Alcohols

In a test which was run exactly like Example IV, an ester was used in place of the long chain alcohol. The ester was Cos SAS 35, which was made by reacting 1 mole of dimethyl glutarate with 2 moles of Alfol 20+, thus yielding a long chain alcohol diester of glutaric acid, a dibasic acid.

When Cos SAS 35 was used in the same recipe as in Example IV, the results were similar to Example IV, especially in the low energy requirements used in processing.

EXAMPLE VI

Long Chain Alcohol in a Synthetic Natural Rubber

In this example, we show the effect of Alfol 20+ in a synthetic natural rubber. The following recipe was used.

TABLE I

| | Parts | | | |
|---|---|---|---|---|
| Natsyn 400 | 100.0 | | | |
| AnO | 5.0 | | | |
| EPC Black | 55.0 | | | |
| Pine Tar | 5.0 | | | |
| PBNA | 1.0 | | | |
| Sulfur | 2.25 | | | |
| Durax | 1.0 | | | |
| Stock | L | M | N | O |
| Alfol 20+ | 2.00 | | 6.00 | |
| Stearic Acid | | 2.00 | | 6.00 |

A rheograph was run (FIG. 1) on four compositions as shown in Table I containing 2 and 6 parts of Alfol 20+ and stearic acid respectively. These show that at 2 parts of stearic acid vs. Alfol 20+, stearic acid acts like an accelerator as compared to Alfol 20+, but at the 6 part level, stearic acid acts as a retarder whereas Alfol 20+ acts as an accelerator even faster than stearic. Furthermore, stearic acid blooms in this recipe, and the Alfol 20+ does not.

I claim:

1. An additive for natural and synthetic olefinic rubbers which is a stearic acid substitute and contains a mixture of (1) a substantial amount of an aliphatic alcohol which contains 12 to 28 carbon atoms, and (2) a substantial amount of an aliphatic dicarboxylic acid which contains 4 to 54 carbon atoms, which additive is not volatile at 200° F. and has an acid number of at least 50.

2. An additive for natural and synthetic olefinic rubbers which is a stearic acid substitute and contains a mixture of (1) a substantial amount of an aliphatic alcohol which contains 12 to 28 carbon atoms, and (2) a substantial amount of an ester to said alcohol and an aliphatic dicarboxylic acid of 4 to 54 carbon atoms, which additive is not volatile at 200° F. and has an acid number or saponification value of at least 50.

3. An additive for natural and synthetic olefinic rubbers which is a stearic acid substitute and contains a mixture of (1) a substantial amount of a dicarboxylic acid which contains 4 to 54 carbon atoms and/or (3) a substantial amount of an ester of an aliphatic dicarboxylic acid which contains 4 to 54 carbon atoms and said alcohol, which additive is not volatile at 200° F. and has an acid number or saponification value of at least 50.

* * * * *